Sept. 10, 1946.  A. S. KROTZ  2,407,559
METHOD OF MAKING RESILIENT BUSHINGS
Original Filed July 1, 1939

Inventor
Alvin S. Krotz
By Willis T. Avery
Atty.

Patented Sept. 10, 1946

2,407,559

UNITED STATES PATENT OFFICE 2,407,559

METHOD OF MAKING RESILIENT BUSHINGS

Alvin S. Krotz, Akron, Ohio, assignor to The B. F. Goodrich Company, New York, N. Y., a corporation of New York Original application July 1, 1939, Serial No. 282,474. Divided and this application April 29, 1942, Serial No. 440,955

2 Claims. (Cl. 18—59)

1

This invention relates to resilient flexible connections and resilient bushings therefor in which the resilient element comprises a body of vulcanized rubber or other rubber-like resilient material secured between relatively movable rigid members, and it pertains more particularly to methods of making flexible connections or springs capable of large amplitudes of elastic deflection through stresses in circumferential shear and therefore suitable for uses such as the suspension of vehicles.

This application is a division of my co-pending application, Serial Number 282,474, filed July 1, 1939.

The principal objects of the invention are to provide a spring of rubber-like material having great resistance to failure, to provide for great resistance to failure of the exposed surfaces of said material and of the bond between said material and the rigid members, and a further object, where the spring takes the form of an inner shaft member, an outer sleeve member, and a body of rubber-like material between these members, is to obtain these advantages where the inner and outer members may both be circumferentially continuous, and a further object is to provide procedure for making these springs, all with convenience and economy and with the results of uniform high quality of the product.

These and further objects will be apparent from the following description, reference being had to the accompanying drawing in which.

2 by provisions for circulating steam outside the spring and inside the hollow shaft, in accordance with the invention.

In accordance with the invention I provide convenient and economical method and apparatus for assembling and vulcanizing the spring and bonding in a manner productive of strength and uniform high quality in the product. Provision is made for vulcanizing the rubber-like material under pressure during at least a part of the vulcanizing period to obtain a good bond between the rubber-like material and the rigid metal members of the spring. As described in my co-pending application, Serial Number 282,474, the rigid members or metals may be then modified in form or shape or relation to each other by permanent distortion of the metal to relieve or avoid shrinkage stresses caused by the cooling of the spring after vulcanization so that the exposed surfaces of rubber-like material shall not be drawn inwardly as a result of such shrinkage, and so that the junction surface between the rubber-like material and the metals shall not be placed under tension by such shrinkage. Preferably the shape of the metals or their relation to each other is so modified as to place the junction area between the rubber-like material and the metals under some compression, which has been found to add materially to the life and resistance to fatigue of the spring, but not so much as to cause undesirable bulging of the exposed faces of the spring.

The exposed surface of rubber-like material is given such a contour as to take full advantage of the modification of the rigid members or metals of the spring in relieving surface stresses to avoid failure at exposed surfaces which has occurred in some prior constructions. Preferably the exposed surface is provided with ribs or other surface form so designed as to prevent objectionable wrinkling of the surface when the spring is flexed through large amplitudes in shear or torsion.

Figure 1:
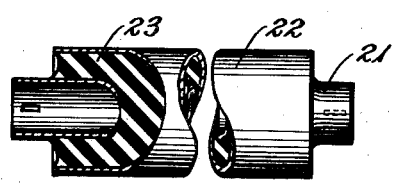
Fig. 1 is a side view, with parts broken away and sectioned, of a cylindrical-type spring, constructed in accordance with and embodying the invention.

In Fig. 1 is illustrated a complete resilient spring or bushing, constructed in accordance with and embodying the invention. The bushing comprises an inner hollow shaft 21, and an outer circumferentially continuous sleeve 22 with an interposed body 23 of rubber or other resilient rubber-like material, the body 23 preferably being adhered by a vulcanized bond to both the shaft and the sleeve.

Figure 2:
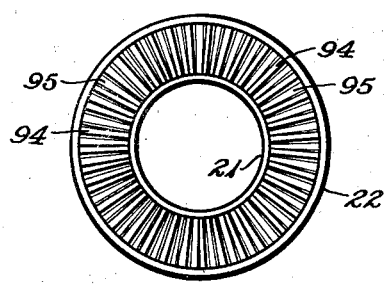
Fig. 2 is an end view of a cylindrical-type spring showing an end construction to avoid wrinkling when the spring is used in torsion in accordance with the invention.

Fig. 2 shows one form of contour of the exposed rubber provided in accordance with this invention to prevent or reduce and control the tendency toward wrinkling of exposed rubber-like surfaces of a rubber spring under stress. In a spring where rubber-like material is attached to or adhered to opposing rigid surfaces, which are given a shear-like movement, as in the rotational movement of the inner shaft with relation to the outer sleeve in the torsion type spring herein described, there is a tendency for the end surfaces of the rubber-like material to take on surface wrinkles which extend outwardly from the shaft and slope or curve in the direction of torsional rotation. In accordance with this invention I provide ribs 94, 94, separated by grooves 95, 95 or other suitable conformation in the exposed surface of rubber so placed that elastic displacements will cause a slight modification of the form of the ribs or other suitable conformation and will reduce or eliminate objectionable wrinkles. Since the conformations are made with a much larger radius at their root than the radius of the folds in a wrinkled rubber surface, and the surface therefore curves gradually rather than sharply, there is not the tendency to start surface failures which exists where the surface is not ribbed and is permitted to wrinkle.

Figure 3:
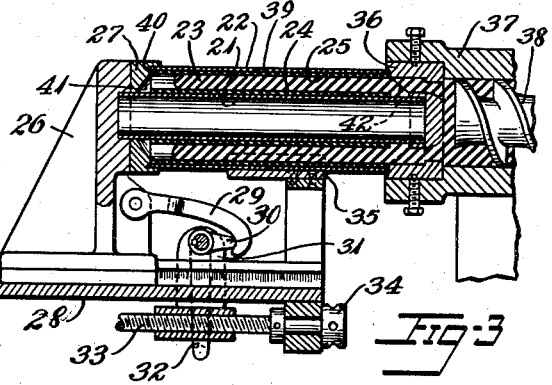
Fig. 3 is a side elevation, with parts broken away and sectioned, of apparatus for extruding rubber-like material into the annular opening between inner and outer members of a cylindrical spring, constructed according to and embodying the invention.

In Fig. 3 is illustrated apparatus for assembling a cylindrical spring or bushing comprising an inner hollow shaft 21, an outer circumferentially continuous sleeve 22 with an interposed body 23 of rubber or other resilient rubber-like material, the body 23 preferably being adhered by a vulcanized bond to both the shaft and the sleeve in the completed structure. A layer 24 of tie gum to promote adhesion of the body to the metal may be used on the inner member, and a layer 25 of tie gum may be used on the outer member for like purpose, if desired.

A movable end plate 26 carrying a collar 27, adapted to close the end of the sleeve 22, is slidably mounted upon a support 28 and is adapted to be held against rearward movement by a latch 29 pivoted upon the end plate 26 and engageable with a locking member 30, the latter being pivotally mounted in a traveling bracket 31 and being operated by a handle 32 turning with the locking member. The bracket 31 is mounted by a threaded engagement upon a rotatable screw 33 for adjustably positioning the bracket, latch, and end plate 26 to accord with the desired length of the cylindrical spring. The screw 33 may be rotated by means of an apertured end collar 34 adapted to receive a suitable manipulating tool.

The outer sleeve 22 of the cylindrical bushing is centrally supported upon an upward extension 35 of the support 28, and the hollow shaft member 21 is supported at one end within the collar 27. At its other end the shaft 21 is supported within a spider 36 mounted within the mouth of an extruding machine 37. The spider 36 also engages the outer sleeve 22 closing the end of the bushing except for the space through the spider 36 through which rubber is forced by a screw 38 of the extruding machine. As the rubber is forced into the space between the inner shaft and the outer sleeve air escapes through apertures which may be in the form of bleed holes 39, or through slots 40, or corner spaces at the inner collar 27, or all of these.

Preferably the collar 27 and the spider 36 are provided with wall surfaces 41 and 42 of such form that some excess rubber is provided at the ends of the bushings.

Figure 4:
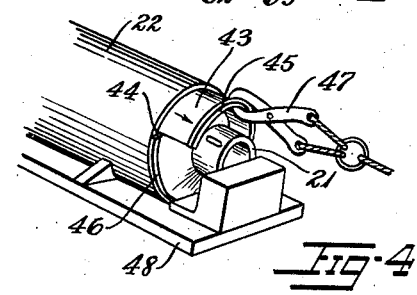
Fig. 4 is a perspective view of a supported spring at a stage in the manufacture thereof.

Under some conditions it will not be necessary to use the layers 24 and 25 of tie gum on the shaft and sleeve respectively, although it is preferred to use the tie gum on the shaft at least, for strength. In some cases, a coating of cement on the surfaces of the sleeve is effective to provide adequate adhesion, and where cement only is used there may be a tendency for the rubber to wipe off the cement as it is forced into the bushing by the extruding machine. In this case thin metallic shields 43 and 44 may be inserted in the sleeve 22 before the rubber is forced into place, the shields being withdrawn after the extruding operation in the manner, for example, as is illustrated in Fig. 4. Preferably the shields are provided with end beads or flanges 45, 46 for engagement by tongs 47 to facilitate the removal, while the bushing is held in place in a cradle support 48. Similar shields of smaller size may be provided at the shaft for cases where cement is used in lieu of tie gum at the shaft.

After the bushing has been filled with rubber in a manner as hereinabove described it is ready for the molding and vulcanizing operation. In accordance with the invention I utilize the inner shaft and outer sleeve of the bushing itself as part of the mold, suitable enclosures being provided, so that by introducing heated fluid within the hollow shaft the rubber is molded and vulcanized in place without requiring additional mold members. In addition to simplicity this has the advantage also of applying the vulcanizing heat to the part of the bushing where it is most needed, namely the portion of the rubber adjacent the inner shaft where inadequate penetration of heat, as has resulted from some molding expedients used heretofore, is likely to result in uncured and poorly adhered rubber at the inner shaft. Because of the smaller bonding area at the inner shaft as compared with the outer sleeve a strong adhesion of the rubber to the inner shaft and a fully cured condition of the rubber in this region are especially desired and the present invention is advantageous in providing these results.

Figure 5:
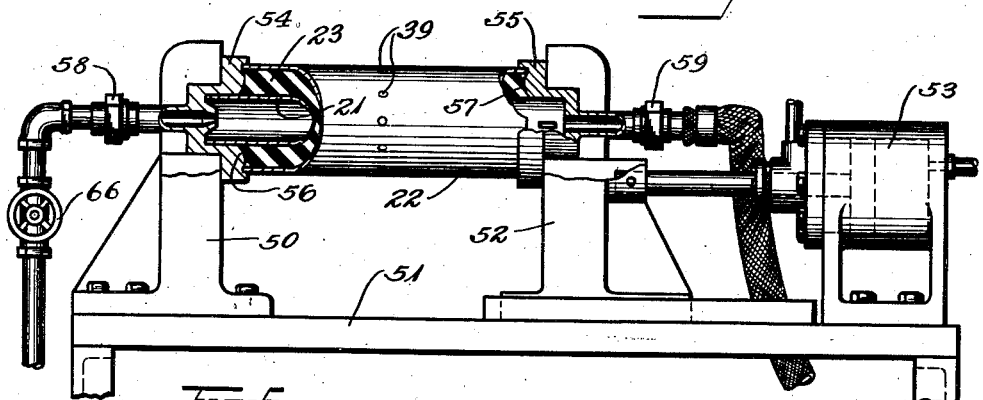
Fig. 5 is a side elevation, with parts broken away and sectioned, of apparatus for vulcanizing a cylindrical-type spring in accordance with the invention.

A suitable curing and molding apparatus for the purpose is illustrated in Fig. 5. One end standard 50 is rigidly mounted upon a support 51 and another end standard 52 is slidably mounted upon the support for adjustment according to the length of the bushing, the standard 52 being urged into molding position by fluid pressure in cylinder 53, preferably hydraulic, so as to maintain molding pressure against the ends of the bushing. The standards 50 and 52 are provided with respective end collars 54 and 55 for closing the annular space of the bushing between the shaft and the outer sleeve, which collars are provided with surfaces 56, 57 for molding the ends of the rubber to the desired contour.

The standards and end collars are apertured for suitable pipe connections 58, 59 for the introduction and exhausting of steam or other heating fluid into and from the hollow shaft of the bushing to effect vulcanization. Heavy molding pressure is assured by the provision of the excess rubber in the bushing, and under the molding pressure the rubber will be squeezed out at the end collars and through the bleed holes 39, these leakage openings however being so small that heavy molding pressure is maintained in the bushing. The end collars 54 and 55 preferably are provided with cylindrical skirts overlapping the outside of the sleeve 22 as shown to prevent the too free escape of the excess rubber to the end of maintaining high molding pressure.

Figure 6:
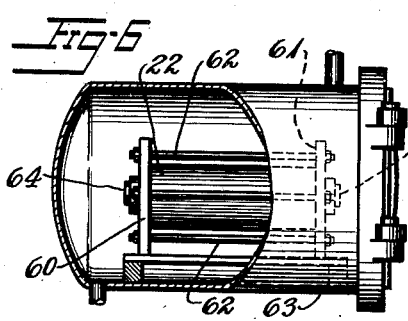
Fig. 6 is a side elevation, with parts broken away and sectioned, of apparatus for vulcanizing a cylindrical-type spring without using a mold.

An alternative method of molding and vulcanizing the bushing may be effected by the apparatus shown in Fig. 6 wherein the bushing is clamped between two end plates 60 and 61 by means of tie bolts 62, 62. The assembly is placed in a steam or other heated chamber 63, the ends of the hollow shaft member being left open at 64, 65 for access of the heating fluid to the inside of the shaft as well as to the outside of the sleeve 22. This manner of curing is especially suitable for bushings of considerable radial thickness in order to provide good heat penetration. The end plates 60 and 61, like the collars 54, 55 of the previously described embodiment, are provided with suitable surfaces for molding the ends of the bushing to the desired contour.

The molding procedures herein described have among their advantages the fact that in vulcanizing the cylindrical bushing by means of heat applied from inside the shaft effective vulcanization of the rubber at the shaft is accomplished and this is important since stresses are highest in the rubber next to the shaft when the bushing is subjected to stresses and therefore what may be referred to as a "tight" cure is particularly desirable near the shaft. The term "tight" cure signifies an advanced stage of vulcanization sufficient to provide the desired high modulus of elasticity of the rubber, hence stiffness of the rubber in the region desired, and low permanent set characteristics.

A "tight" cure is desirable especially near the shaft of the resilient bushing owing to the fact that when the rubber is subjected to a torsional load, the unit stress in the rubber decreases as the radius increases; therefore the most efficient use of the rubber in the resilient bushing is obtained when the modulus of elasticity of the rubber decreases as the radius increases outwardly from the torsional axis of the bushing. My invention provides accordingly for applying heat inside the hollow shaft by the passage of steam or other heating fluid therethrough whereby the desired "tight" cure is obtained at a zone adjacent the shaft. If desired, external heat losses of the bushing during vulcanization may be compensated for by adding external heat to the outer sleeve such, for example, as in the manner as shown especially in Fig. 6.

If desired the flow of the heating fluid during vulcanization may be increased gradually as by manipulation of valve 66 in such a manner as to provide some decrease in the specific gravity of the rubber-like material throughout the vulcanization period for the purpose of maintaining pressure against the bonding surface throughout a predetermined portion of the vulcanizing period to the end of producing increased bonding strength.

Variations may be made without departing from the scope of the invention as it is defined in the following claims:

I claim:

1. The method of making a resilient bushing subject to stresses in circumferential shear in which a body of rubber-like material is molded within an outer sleeve member, which method comprises coating the inner surface of said outer member with an adhesive material, positioning shield elements adjacent the coated surface, forcing a body of rubber-like material within said shield elements, then removing the shield elements from the bushing and applying molding pressure and vulcanizing heat to said body to bond said material to said outer member and vulcanize the material.

2. The method of making a resilient bushing subject to stresses in circumferential shear in which a body of rubber-like material is molded within an outer sleeve member, which method comprises coating the inner surface of said outer member with an adhesive material, positioning a shield element adjacent the coated surface, forcing a body of rubber-like material within said shield element, then removing the shield element from the bushing and applying molding pressure and vulcanizing heat to said body of rubber-like material to bond said adhesive material and rubber-like material to said outer sleeve member and to vulcanize said rubber-like material.

ALVIN S. KROTZ.